United States Patent

[11] 3,598,363

| [72] | Inventor | Harry N. Shaw<br>Chicago, Ill. |
|---|---|---|
| [21] | Appl. No. | 855,086 |
| [22] | Filed | Sept. 4, 1969 |
| [45] | Patented | Aug. 10, 1971 |
| [73] | Assignee | The Golconda Corporation<br>Chicago, Ill. |

[54] BALL VALVE
19 Claims, 4 Drawing Figs.

[52] U.S. Cl. .................................. 251/172,
251/315, 251/317
[51] Int. Cl. ........................................ F16k 25/00
[50] Field of Search .......................... 251/170,
171, 172, 174, 315, 173, 307

[56] References Cited
UNITED STATES PATENTS

| 2,514,551 | 7/1950 | Monroe | 251/175 X |
| 2,942,840 | 6/1960 | Clade | 251/174 |
| 3,195,560 | 7/1965 | Pofit | 251/172 X |
| 3,378,026 | 4/1968 | Oliver | 251/172 X |
| 3,477,691 | 11/1969 | Griswold | 251/172 |
| 3,497,178 | 2/1970 | Priese | 251/174 |

Primary Examiner—Harold W. Weakley
Attorney—Harbaugh and Thomas

ABSTRACT: A ball valve having fireproof spring-pressed bearing rings serving as secondary seals on both sides of the ball with a primary chevron-shaped flexible plastic seal between the secondary seal bearings adjacent to the inlet side of the valve as back by a seal support ring with some lost motion so that when the valve is closed, the inner edge of the primary is marginally pressed flat against the ball by pressure on one side of the valve, and when pressure is on the other side of the ball the V-shape of the chevron is flattened substantially to press the chevron edge against the ball.

PATENTED AUG 10 1971 3,598,363

INVENTOR.
HARRY N. SHAW
BY
Harbaugh + Thomas
ATT'YS

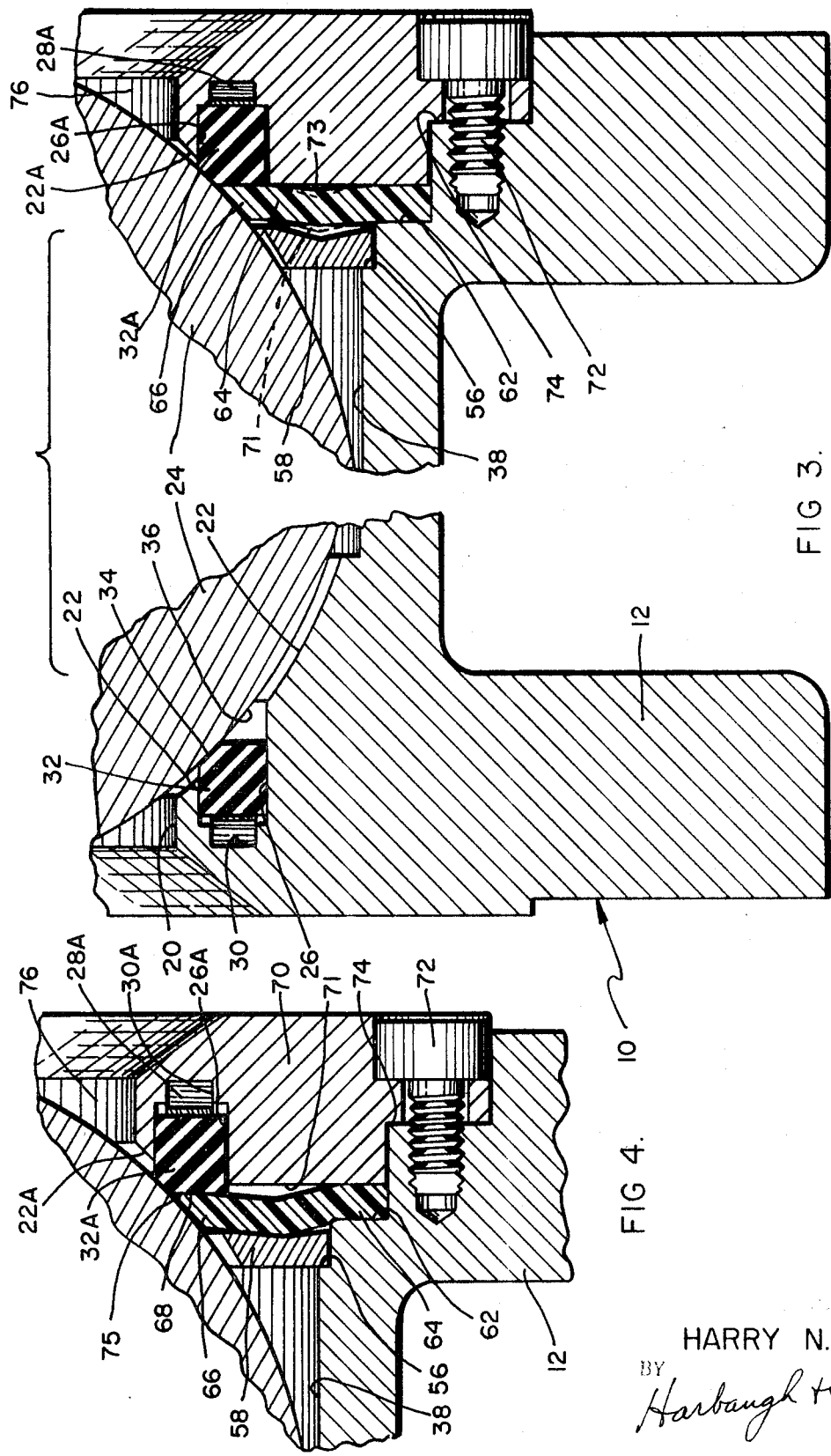

BALL VALVE

BACKGROUND OF THE INVENTION

Ball check valves generally employ two primary seals, one on each side of the ball, to prevent leakage past the valve in either one of both directions. This curtails design economies for the parts and their assembly time and either requires machining a body for assembling parts from two directions or through a single transverse opening where the ball itself with seals already assembled thereon are inserted at one time. With this latter, tolerances have to be kept quite close and the presence of any seal springs interfere with the assembly. To provide fireproof secondary seals would merely add to the cost and assembly problems in their constructions. Moreover, the balls under movement induced pressure conditions bear heavily upon the flexible or primary seals with resulting wear, or they must be very accurately journaled within close tolerances which presents production and assembly difficulties.

SUMMARY OF THE INVENTION

Developments in controlling various fluids under a wide range of pressures, either inlet or back pressure, require a valve of excellent operativeness that is simple in construction for greatest strength; is easily assembled for consistent results; and is readily serviceable when occasion requires. The present valve is designed to provide and accommodate appreciable movement of the ball under directional reversal of pressures in use.

The valve comprises a body flanged at both ends and having a central valve chamber of stepped dimensions providing a progression of shoulders to receive all the valve parts through one opening, including the ball element, with the assembly completed by a compression ring bolted in place. Two graphite fireproof rings are spring pressed to maintain contact and serve as combination bearings and seals against opposite sides of the ball under opposing spring pressures and alternately bottom on the body with slight movement of the ball to serve as a bearing for the ball under lockup pressure in either direction. Between such secondary bearing seals is located a single ring seal of flexible Teflonlike material, preferrably chevron-shaped, supported for controlled movement in an axial direction to serve as a dual primary seal. On one side the ring seal is supported by a substantially flat face on one of the graphite rings and on the other by a chevron-recessed face on a seal support ring. The inner edge portion of the Teflon ring seal engages marginally against the ball in two relationships under pressures applied in opposite directions. In one direction the ring seal rests in the chevron-recess while a tapered inner edge portion of the seal is pressure-pressed flatly against the ball valve, figuratively speaking, and in the other direction the chevron is flattened toward the flat face of the graphite seal to urge the tapered inner edge radially inwardly against the ball over a circular area whose diameter is substantially less than that of the ball, the taper being related to the curve of the ball on one side and the face of the graphite ring on the other.

Although the structure of the valve will be described with the one direction being designated as the valve inlet side, this valve, not like other single seal valves, can be connected either way. More orientations however will be with the inlet side nearest the primary seal because it is more desirable that the primary seal be on the upstream side of the stem packing to minimize chances of leakage at the stem packing, although in this particular valve this is not a problem because the stem is also sealed by a Teflon washer under a running seal engagement.

One of the objects of the invention is to provide a simple construction of bearings and seals capable of utilizing mechanically equivalent materials within the parameters of their physical characteristics which may be selected for handling particular fluids having different chemical structures and pressures.

An object of the invention is to provide a ball valve which can be assembled without any hand tools other than a wrench or screwdriver and with a final rectilineal clamping of the parts that avoids any twisted dislocations of parts or portions thereof.

A further object is to provide an essentially fireproof valve construction and arrangement for handling any and all fluids at all pressures coming within the parameters of ball valve applications.

An object of the invention is to provide a minimum thickness primary seal supported free of mechanical or valve component compressions that cause cold flow and distortion and arranged to provide a bidirectional sealing action rated to seal from 0+ p.s.i. to maximum pressure.

The invention is characterized by the ball of the valve having only one opening through it, a flow passage, and a closed-bottom stem receiving socket to receive the wrench end of a smooth-walled stem journaled at both ends that in addition to a running seal is easily packed against leakage and is secured by a spanner element which holds both the stem and a handle in an operative position that is supported against all pressure and manipulation strains at any valve orientation.

The invention also contemplates a minimum number of parts, compactly arranged, an independent adjustment of the valve stem packing with a small wrench and a valve stem journaled at both ends to remove all radial strains from the valve stem which would tend to loosen the packing.

IN THE DRAWINGS

FIG. 3 is an enlarged fragmentary sectional view of the seal constructions shown in FIG. 2 with the valve closed and pressure applied downstream of the valve; and FIG. 4 is a view of the primary seal end portion of the valve shown in FIG. 3 illustrating the valve closed and pressure applied upstream of the valve.

Figure 1:
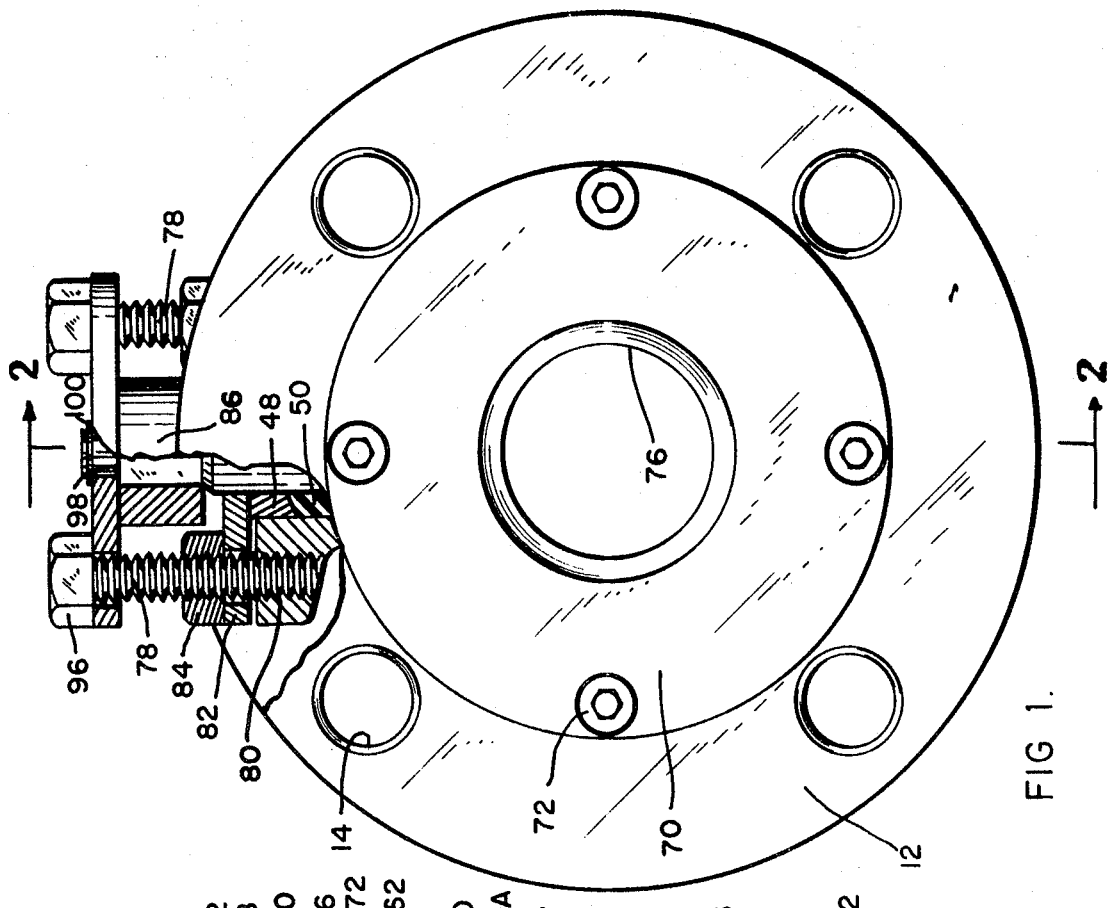
FIG. 1 is a partly cut away view of what may be termed the inlet end of a ball valve construction embodying the invention.

The valve comprises a body 10 having integrally formed end flanges 12 apertured at 14 for bolting in service to flanged pipe connections in a well-known manner. The central portion 16 of the body centrally defines a ball valve chamber 18 as part of an axial passage 20 therethrough. At the outlet side of the chamber the wall is spherically rounded as at 22 to clear the ball 24 and terminates in an axial groove 26 that reciprocably receives a ring 32, the groove preferably having a bottom recess 30 which receives a way spring 28 behind the ring 32 to cushion mount the ball as well as hold the ring and ball in bearing relationship. The ring 32 is preferably of graphite bonded by a resin and serves as a combination bearing and seal ring whose ball engaging surface 34 spherically mates in continuous contact with the spherical surface 36 of the ball 24.

The central portion of the chamber is cylindrical as at 38 and of a diameter to clear the ball 24. The ball 24 serves as a valve element having a passage 40 therethrough equal to the diameter of the passageway 20 in the valve body. The diameter of the passage 40 is substantially less than its length whereby in the "off" position of the valve the seal 32 engages marginally an unbroken spherical surface of the ball when in its closed position as when the passage 40 is disposed at right angles (FIG. 3) to its position shown in FIG. 1.

At its inlet end the chamber 18 is enlarged to provide a shoulder 56 to support a seal support ring 58 having a shallow V-groove 60 on its axially exposed surface. Beyond the support ring the chamber is further enlarged to provide a shoulder 62 against which a flexible Teflon seal ring 64 marginally rests. The optimum shape of the seal ring 64 is washerlike with the portion intermediate the inner and outer edges formed concave on one side and convex on the other side and with the intermediate portion sinusoidal with the waves thereof extending in a radial direction so that the concavity of the ring can be flattened with the maximum resulting inward movement of the inner edge for purposes herein described. However, from a production viewpoint the concavity of the rings 58 and 64 can normally be that which is often referred to as chevron. The two shapes accordingly correspond but the rings are normally spaced therefrom a slight distance due to the axial spacing between shoulders 56 and 62 (FIG. 3). The inner marginal edge 66 rests against the ball 24 on one side and on its other side normally engages the flat face 68 of the graphite ring 32A which is received likewise in another groove 26A as backed by a second wave-spring 28A located in a recess 30A at the bottom of the groove.

In this instance the groove 26A is in a compression ring 70 that is spherically rounded at 22A. The flow opening 76 through it is the same size as the opening 20. The compression ring 70 is bolted to the valve body 10 by screws 72 to hold the periphery of the chevron seal 64 in place and compress the wave springs 30 and 30A to urge the graphite rings 32 and 32A in snug bearing engagement with the ball. The graphite rings serve as secondary seals if the Teflon seal is vaporized by extreme heat, and the ball goes metal-to-metal on the spherical surfaces 22 and 22A if the graphite rings disintegrate under extreme heat.

This construction and arrangement of the elements permits excellent throttled flow. When opening the valve, the port of the ball opens across the graphite ring subsequently to opening across the Teflon seal ring, and when closing the valve, the port of the ball closes across the graphite ring before the Teflon seal ring. Thus any effects of high velocity flow is restricted to the graphite ring and ball and not to the Teflon ring. Moreover, the Teflon ring is relaxed under this condition.

The compression ring 70 is recessed on a shoulder 74 which limits the degree and the area of compression exerted upon the seal 64 to approximately 20 percent. Such extends over less than the peripheral one-third of its radial dimension with the remainder free of any compression forces other than the pressure of the fluid being controlled. Moreover, the compression ring dimensionally is well within the boundaries of flange 12 where there is no mutual interference with the connection of a flanged service pipe secured thereto.

Normal to the axis of tee passage 40 and at the thickest part of its wall portion the ball valve element 24 is provided with a wrench socket 42 shown cross-sectionally square which is disposed in alignment with a journal opening 44 enlarged at 45 to provide a shoulder 47 and beyond which the bore is enlarged as at 46 to receive a packing 50 and a gland 48 to seal the valve stem 52 that is journaled in the bearing 44. The inner end of the valve stem has a square end 54 received in the socket 42 and radially flanged portion 51 carrying a Teflon washer seal 53 engaging the shoulder 47.

Two studs 78 are threaded into the body as at 80 and are disposed parallel to the valve stem 52 to receive thereon a lower plate 82 driven by two nuts 84 on the studs to clamp the gland 48 and packing 50 in place. Externally of the plates 82 the hub 86 of a handle 88 is received at 90 in squared mating relationship and the outer end of the stem 52 beyond the hub 86 is journaled as at 94 in an upper plate 92 that is bolted in place on the studs by end nuts 96 with sufficient clearance to permit the washer supporting shoulders to go metal-to-metal upon destruction of the washer to provide a seal at this point. A spring retainer ring 100 snaps into place in a groove 102 on the outer end of the stem. This relationship assures rigid constancy of the stem axis and holds the handle in place while the flange 51 supports the valve stem against outward movement by engagement with shoulder 47.

Movement of the handle 88 from a position parallel to the axis of the passage 20 to a position crosswise thereto turns the valve from "on" to "off" and as shown in FIG. 4 the ball 24 is moved by the pressure in the inlet a few thousandths of an inch to the left as viewed to bear heavily against the outlet graphite bearing ring 32 that is solidly bottomed with this movement against the shoulders in its groove 26. The other graphite bearing ring 32A follows the ball under the action of its wave spring 30A and carries with it the flat face portion 68 of the chevron seal 64 to maintain it in contact with the ball 24. This movement permits the seal ring 64 to rest against the seal support ring 58 and any pressure passing the graphite bearing presses the inner rim portion 66 of the seal ring against the ball as shown in FIG. 4.

When the pressure is directed in the opposite direction as where back pressure arises while a fluid supply tank is being replaced, the pressure moves the ball appreciably in the opposite direction as shown in FIG. 3 with reverse movement of the graphite seals and any pressure passing the Teflon seal 32 tends to flatten the chevron shape of the seal ring 64 against the face of the compression ring 70 and seal-bearing 32A. The flattening action of the chevron seal extends its inner portion radially inwardly to force the inner rim portion 66 of the seal ring inwardly enough to establish a wedging sealing action between the ball 24 and the bearing ring 32A, the bearing ring 32A in this instance bottoming in its mounting groove 26A under the movement of the ball valve to be flush with the face 71 of the compression ring 70. The arch of the chevron shape of the seal 64 is great enough as shown in dotted lines at 71 (FIG. 3) that the flattening of the seal is not complete, leaving a space as shown at 75 so that some radial pressure will always exist on the inner rim portion 66.

In this connection it is to be noted that the apex edge of the inner rim portion 66 is relieved or rounded at 73 so that the radial pressure is not opposed by a wedge point but rather the full resulting components of the radial pressure are exerted through the opposite sides of the rim portion for sealing purposes.

In event the ball valve 10 is heated by a damaging fire that causes the Teflon seal ring 64 to fail, it will be noted that with the pressure forcing the ball to bottom on one or the other bearing-seals depending upon the direction of the pressure. The pressure places both peripheral edges of the bearing 32 under pressure of sealing contact with both of its engaged supporting ledgelike shoulders in the groove 26 or 26A, and, although there may be some leakage, such is sufficiently slight under these compression conditions that the valve can qualify for fail-safe conditions even though the Teflon seal is completely damaged. This is true notwithstanding that under the operation explained and the restricted mounting space provided the Teflon seal ring 64 the Teflon material is substantially confining to operative orientation even under substantial heat flow conditions of the seal material unless and until it is vaporized by heat.

The ease of assembly is believed to be apparent to labor with little if any instruction even with little previous assembly experience. After the studs 78 are mounted the body 10 is laid flat on its outlet side with the wide mouth of the chamber 18 up. One wave spring 28 and bearing-seal 32 is dropped in the groove 26 and the stem 52 is angled into place through the wide opening. The ball is then lowered into place with its socket 42 angled onto the square end 54 of the stem, the socket being widened as at 43 either in an axial or transverse direction, if need be, but in only one direction for this purpose. The ball is then turned to rest in place with it in partly "open" position.

The seal support ring 58 and seal ring 64 are then laid in place on the ball and on the shoulders 56 and 74 ready to receive the compression ring 70 which has its wave spring 30A and bearing-ring 32A already installed. The assembler then inverts the compression ring 70 assembly and with his finger through the opening 76 pressing against the bearing-ring 32A to temporarily hold it in place, he lowers the assembly into place with his finger being received in the half-open ball valve passageway 40. Thereupon the screws 72 can be started and finger tightened in place.

Figure 2:
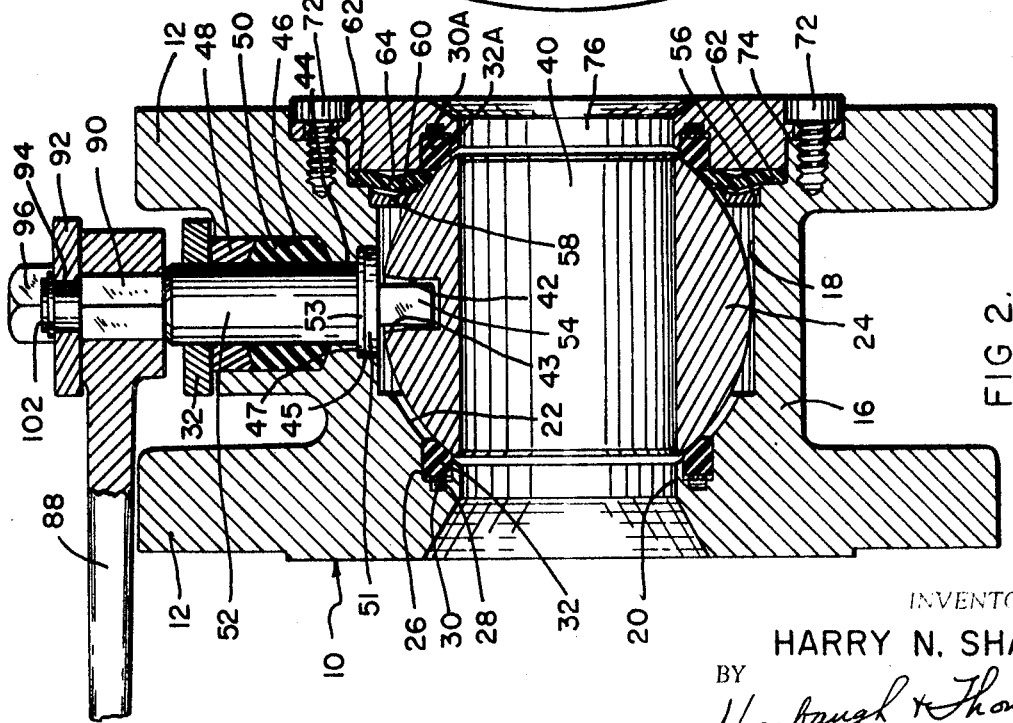
FIG. 2 is a section taken on line 2–2 of FIG. 1 shown with the valve open.

The valve body 10 can then be righted to set it on its flange edges as shown in FIGS. 1 and 2 with the studs 78 upright. Thereupon the ball 24 can be finger jostled if need be to settle it in position and the packing 50, gland 48 and gland plate 82 can be installed. The nuts 84 are then installed and they and the screws 72 can be tool tightened. The handle 88 is thereafter installed and the upper plate 92 fastened in place ready for final inspection and gland adjustment. It will be appreciated that there are no locked-up strains exerted on the assembled parts when bolting the ball valve body into its service position with flanged service pipes.

Although other resilient elements can be used, wave springs 28 are preferred since they particularly provide a bubble tight seal at low pressures such as those measured in inches of water column, thus avoiding bubble leakage in the valve at all pressures.

It should also be noted that the graphite rings 32 essentially perform a bearing function to support the ball rotatably in place for the purposes described and when the Teflon seal is operative the graphite rings do not function as a seal although they may be considered to be part of the sealing means. It is when the Teflon "gases out" for any reason that the graphite rings serve at least partially as seals even though some leakage is permitted. Otherwise the seal described as a Teflon ring retains its flexibility and provides sealing under all temperature conditions both constant and variable temperature conditions throughout a range from extremely low cryogenic temperature to extremely hot temperatures of 450° F.

The materials mentioned are the specific materials preferred generally. "Teflon" itself is a proprietary product including polymers of tetrafluoroethylene and as used herein it is to be interpreted to include plastics which are equivalent in chemical and mechanical characteristics capable of handling particular or special fluids as desired, and, where "graphite" is used it is to be interpreted to include bearing materials which are equivalent in chemical and mechanical characteristics usable with particular or special fluids being handled, the mechanical characteristics being selectable for handling different pressures. These names are used in the context herein as definitive of characteristics desired.

What I claim is:

1. A ball valve comprising a housing having a passage therethrough with openings in opposite sides and including a chamber therebetween,
   a ball valve member mounted for rotation in said chamber and movable appreciably in opposite directions,
   opposing ring bearing means internally mounted on the housing inwardly of and adjacent to said openings for limited axial movement and engaging said ball valve member,
   resilient means urging said bearing means towards each other to retain bearing contact with the ball and locate the ball in working position,
   said ball valve when closed being movable under pressure of fluid in the housing predominantly towards one of said bearing means against its resilient means,
   means for sealing said one of the bearing means against said housing under said ball movement and pressure, and
   pressure responsive ring seal means disposed between one of said bearing means and the ball in a space axially greater than its axial thickness and urged by pressure to move in either axial direction to marginally engage said ball in sealing relationship.

2. The combination called for in claim 1 in which said means for sealing said one of the bearing means comprises an annular groove opening in an axial direction in the wall of the housing around one of said openings and includes bottoming means engaged by said one of the bearing means under sealing pressure to limit movement of the ball valve.

3. The combination called for in claim 1 in which said pressure responsive ring seal means comprises a washer of resilient material cross-sectionally shaped concavely radially beyond said bearing whose inner marginal edge is bevelled to rest against said ball valve member.

4. The combination called for in claim 1 in which said pressure responsive ring seal means includes a seal support ring spaced from said one of said bearing means a distance greater than the axial thickness of said ring seal means to define an axial space between them in which said ring seal means may move bodily in an axial direction, and
   a chevron seal ring mounted for movement axially in said space with its inner edge resting against said ball valve member.

5. The combination called for in claim 1 including a bodily movable seal support ring carried by said housing disposed at an angle to the surface of said ball valve member in a position normally spaced from the plane of the inner edge of said ring seal means and located in the side of the housing opposite said one of said bearing means.

6. A ball valve comprising a housing having a passage therethrough with openings in opposite sides and including a chamber therebetween,
   a ball valve member mounted for rotation in said chamber and movable appreciably in opposite directions,
   opposing ring bearing means internally mounted on the housing inwardly of and adjacent to said openings for limited axial movement and engaging said ball valve member,
   resilient means urging said bearing means towards each other to retain bearing contact with the ball and locate the ball in working position,
   said ball valve when closed being movable under pressure of fluid in the housing predominantly towards one of said earing means against its resilient means,
   means for sealing said one of the bearing means against said housing under said ball movement and pressure, and
   pressure responsive ring seal means disposed between one of said bearing means and the ball and urged by pressure in either direction to marginally engage said ball in sealing relationship,
   a chevron seal ring mounted for movement axially in said space with its inner edge resting against said ball valve member,
   said ring seal means including a seal support ring spaced from said one of said bearing means to define an axial space between them and having a face shaped to match the chevron contour of the seal ring,
   the housing around said one of said bearing means having a flat surface facing said seal ring and contacting said seal to support it when flattened.

7. A ball valve a housing having a passage therethrough with openings in opposite sides and including a chamber therebetween,
   a ball valve member mounted for rotation in said chamber and movable appreciably in opposite directions,
   opposing ring bearing means internally mounted on the housing inwardly of and adjacent to said openings for limited axial movement and engaging said ball valve member,
   resilient means urging said bearing means towards each other to retain bearing contact with all and locate the ball in working position,
   said ball valve when closed being movable under pressure of fluid in the housing predominantly towards one of said bearing means against its resilient means,
   means for sealing said one of the bearing means against said housing under said ball movement and pressure, and
   pressure responsive ring seal means disposed between one of said bearing means and the ball and urged by pressure in either direction to marginally engage said ball in sealing relationship,
   a chevron seal ring mounted for movement axially in said space with its inner edge resting against said ball valve member,
   said ring seal means including a seal support ring spaced from said one of said bearing means to define an axial space between them and having a face shaped to match in facing relationship the convex side of the chevron contour of said chevron seal ring.

8. A ball valve comprising a housing of two parts having a passage therethrough including a chamber with opposing spherical sealing surfaces around the openings and a valve stem opening whose axis is normal to said passage, one of said openings and said valve stem opening being formed in one of said two parts,
  a ball valve member mounted for rotation in said chamber to engage either one of said surfaces in metal to metal contact,
  stem means engaging one side of the ball valve member only to permit the remote side thereof to move appreciably in a direction axially of said passage for the ball valve member to engage said surfaces,
  opposing fire resistant bearing means internally mounted inwardly of and adjacent to said spherical sealing surfaces for limited axial movement and engaging said ball valve member in rotatable bearing supported relationship to normally hold the ball valve member in working position in spaced relationship from said spherical sealing surfaces,
  resilient means urging said bearing means towards each other to locate them and retain baring contact with the ball,
  said ball valve under pressure when closed being movable towards one of said bearing means against the effort of its resilient means, and
  means for sealing said one of the bearing means with respect to the housing under said ball movement and pressure.

9. The combination called for in claim 8 in which said bearing means is made of resin bonded graphite and has a spherical surface mating with that of said ball valve member.

10. The combination called for in claim 8 in which said valve member and stem means interengage in a direction axial of said stem means and including
  packing means received in said valve stem opening,
  gland means holding said packing under compression, and
  stud means journaling the outer end of said valve stem, said interengagement including a wrench socket on one element elongated in the axial direction to a dimension greater than the dimension on the mating member in the same direction.

11. The combination called for in claim 8 in which said valve stem opening has an enlargement at its inner end providing an inwardly directed shoulder, and
  said stem means has a radial flange means on its inner end engaging said shoulder in sealed relationship under pressure.

12. The combination called for in claim 8 in which said housing has a lateral bearing bore intersecting said chamber and outwardly enlarged to provide a packing and gland chamber,
  a valve stem journaled in said bearing bore,
  packing and gland means in said gland chamber around said stem,
  a handle received on said stem, and
  bearing means axially aligned with said bore and journaling the outward end of said stem.

13. A ball valve comprising a housing having a passage therethrough including a chamber with opposing spherical sealing surfaces around the openings and a valve stem opening whose axis is normal to said passage,
  a ball valve member mounted for rotation in said chamber to engage either one of said surfaces in metal to metal contact,
  stem means engaging one side of the ball valve member to permit the remote side thereof to move appreciably in a direction axially of said passage for the ball valve member to engage said surfaces, said valve member and stem means interengaging in a direction axial of said stem means and including
  a. packing means received in said valve stem opening,
  b. gland means holding said packing under compression, and
  c. stud means journaling the outer end of said valve stem.

a handle received on said stem and said stud means including a lower plate holding the gland in place,
  an upper plate journaling said valve stem with the handle between the plates, and
  means independently holding the plates in adjusted position,
  opposing fire resistant bearing means internally mounted inwardly of and adjacent to said spherical sealing surface for limited axial movement and engaging said ball valve member in rotatable bearing supported relationship to normally hold the ball valve member in working position in spaced relationship from said spherical sealing surfaces,
  resilient means urging said bearing means toward each other to locate them and retain bearing contact with the ball,
  said ball valve under pressure when closed being movable towards one of said bearing means against the effort of its resilient means, and
  means for sealing said one of the bearing means with respect to the housing under said ball movement and pressure.

14. A ball valve comprising a body member having a passage therethrough with an opening on one side and an axially directed annular groove around said opening with a recess in the bottom defining at least one shoulder in the wall of said groove,
  a wave spring received in said recess,
  a graphite seal ring received in said groove and normally held away from said shoulder and having a planar surface,
  a ball valve received against said seal ring on the planar surface side in bearing relationship,
  a Teflon chevron seal ring having its inner marginal edge beveled and engaging said ball in sliding sealing relationship,
  a seal support ring adjacent to said chevron seal ring having a shallow V-groove facing the chevron seal ring and spaced from said planar surface of the graphite seal ring a distance approximately as great as the thickness of said chevron seal ring,
  said chevron seal ring flattening towards said planar surface when pressure is applied from the direction of the ball to move its inner marginal edge radially inwardly between the ball and graphite seal ring.

15. A valve comprising a valve body having a valve chamber and inlet and outlet passages in communication with the valve chamber,
  a valve member disposed within the valve chamber and movable between open and closed positions relative to the inlet and outlet passages,
  means for rotating the valve member,
  bearing seal means around each passage engaging said valve means with one of them defining an acute angle therewith providing a tapering space between the inner surface of the one bearing seal means and the valve member,
  ring seal means extending into said space and engaging said valve means contiguous to said bearing seal means within said tapering space as supported by said bearing seal means, and
  ring seal support means cooperating with said one bearing seal means to provide space therebetween for limited axial movement of the intermediate portion of the ring seal means which is in said space for the inner portion to follow movement of the ball.

16. In a ball valve the combination of
  a ball valve member having a passage therethrough,
  a housing means enclosing the ball valve member,
  a ring element carried by the housing bordering said passage and surrounding the ball valve, said element having a face disposed essentially normal to said passage and being off-center of said ball to define an acute angle with with the spherical surface of the ball around said passage,
  a formed resilient sealing ring supported by the housing in sealed relationship and arched intermediate its radially spaced inner and outer edges to provide a concave face on one side facing said flat wall, and a seal support carried by said housing spaced from said flat wall and defining a concave wall accommodating the other side of the sealing ring, the inner edge of said sealing ring being tapered to be received in the space between the ball and flat face portion that is proximate to said ball.

17. The combination called for in claim 16 in which said ring element comprises a graphite ring having a spherical surface mating with said ball valve member.

18. The combination called for in claim 17 in which said housing means has an inlet opening and an outlet opening for the passage and a spherical sealing surface concentric with and between said ring element and one of said to engage said ball valve member in metal to metal contact in absence of said ring element.

19. A ball valve comprising a housing member flanged at both ends and having a passage therethrough including a central valve chamber of stepped dimensions providing a progression of shoulders to receive in supported spaced relationship the valve parts through the wide portion of the chamber, a compression ring member secured to said housing member within the dimensional confines of the flanges to close said chamber and having a passage therethrough, said members having facing annular grooves internally around the openings of said passages with a recess in the bottom defining at least one shoulder in the wall of each groove, a spring means in each recess, a graphite seal ring received in each groove normally held by the spring means away from said shoulders and having facing surfaces, a ball valve received between said seal rings under compression of said spring means to rotatably support the ball valve in sealed relationship upon the seal rings and defining acute angles with the facing surfaces, a chevron seal ring marginally clamped between said members at one of said shoulders having its inner marginal edge beveled and engaging said ball in sliding sealed relationship in the space defined by one of said acute angles, a seal support ring resting against the adjacent smaller shoulder in spaced relation to said chevron seal ring and having a shallow V-groove facing the convex side of the chevron seal ring, said chevron seal ring flattening against the adjacent one of the facing surfaces when fluid pressure is applied from the ball side thereof to move its beveled marginal edge radially inwardly in said space as the graphite seal ring adjacent thereto is moved to bottom against the shoulder in its supporting groove.